(12) United States Patent
Barcan (10) Patent No.: US 7,565,828 B2
(45) Date of Patent: Jul. 28, 2009

(54) SYSTEMS AND METHODS FOR TESTING PACKAGING

(75) Inventor: Donald Spencer Barcan, Long Valley, NJ (US)

(73) Assignee: Donbar Industries, Inc., Long Valley, NJ (US)

( * ) Notice: Subject to any disclaimer, the term of this patent is extended or adjusted under 35 U.S.C. 154(b) by 261 days.

(21) Appl. No.: 11/446,557

(22) Filed: Jun. 2, 2006

(65) Prior Publication Data

US 2006/0277975 A1    Dec. 14, 2006

Related U.S. Application Data

(60) Provisional application No. 60/690,182, filed on Jun. 10, 2005.

(51) Int. Cl.
*G01M 3/02* (2006.01)
(52) U.S. Cl. ......................................................... 73/37
(58) Field of Classification Search .................. 73/37, 73/37.7, 38, 40, 41.2, 45.5
See application file for complete search history.

(56) References Cited

U.S. PATENT DOCUMENTS

| | | |
|---|---|---|
| 4,014,433 A | 3/1977 | Cerwin |
| 5,868,244 A * | 2/1999 | Ivanov et al. .............. 206/63.3 |
| 5,939,619 A | 8/1999 | Achter et al. |
| 6,354,142 B1 * | 3/2002 | Nothhelfer et al. ........... 73/49.3 |
| 6,460,405 B1 | 10/2002 | Mayer et al. |
| 6,895,811 B2 * | 5/2005 | Carey et al. ................... 73/159 |
| 2004/0177676 A1 * | 9/2004 | Moore ........................... 73/38 |

FOREIGN PATENT DOCUMENTS

| | | |
|---|---|---|
| GB | 2367527 A | 4/2002 |
| JP | 2004066730 A2 | 3/2004 |

* cited by examiner

*Primary Examiner*—Hezron Williams
*Assistant Examiner*—Gunnar J Gissel
(74) *Attorney, Agent, or Firm*—Law Offices of Rita C. Chipperson, P.C.

(57) ABSTRACT

Disclosed are apparatus and methods for testing packaging and/or materials (e.g., package integrity and/or seal strength testing) wherein one or more coatings are applied to the one or more surfaces of the packaging and/or materials prior to testing. In one aspect of the present invention, when applied to a permeable package or a portion thereof, the coating transforms the package, or portion thereof, to an impermeable package or a package having impermeable portions thereof. After such transformation, a wider variety of testing methods including quantitative test methods may be used to test such permeable packages including standard burst seal strength, dye seal integrity, and package integrity tests. Furthermore, application of one or more coatings to the permeable package and/or material prior to testing enhances the sensitivity and repeatability of the test methods allowing for more reliable seal strength measurements and consistent detection of small defects (e.g., pinholes).

21 Claims, 7 Drawing Sheets

SYSTEMS AND METHODS FOR TESTING PACKAGING

CROSS-REFERENCE TO RELATED APPLICATIONS

This application claims the benefit of the U.S. provisional patent application entitled "Wholeseal™", having Ser. No. 60/690,182, filed Jun. 10, 2005, which is incorporated by reference in its entirety as if fully set forth herein.

BACKGROUND OF THE INVENTION

Embodiments of the present invention generally relate to apparatus and methods for testing packaging. More specifically, the present invention relates to apparatus and methods for testing packaging such as the integrity and/or seal strength of packaging, wherein one or more coatings are applied to one or more surfaces of the packaging prior to testing.

Many apparatus and methods have been created for packaging objects in impermeable membranes. In one simplistic form, apparatus have been created in the form of heat sealed pouches, containers, or envelopes for providing protection to moisture sensitive and/or sterile objects. In one such embodiment, packaging for protecting medical sutures during storage is provided. This packaging consists of two panels formed from a moisture impervious material such as aluminum foil. The aluminum foil is coated with a heat sealable resin such as polypropylene to further protect the sutures. The suture is placed between the two panels and heat is applied to the periphery of the panels to create a pocket for the suture in which such suture is protected from atmospheric moisture. The panels may additionally contain a tearing notch for simple removal of the sutures from the pocket.

Another similar apparatus for hermetically packaging food products is also known. For this apparatus, a package is formed by attaching a packaging film to the top of a container in which food is held. The packaging film includes an outer carrier layer, an inner heat-sealed layer, and a seal layer, wherein the heat-sealed layer is attached to the seal layer via an adhesive. Prior to heating, the three layers prevent the food product from losing moisture content and maintain the pressurization of the container. When the package is heated, pressure builds inside the container allowing the food product to be pressure-cooked. When a predetermined temperature and pressure are reached, the three layers become gas permeable allowing the container to self-vent, thereby preventing the package from bursting. Such packaging extends the shelf life of the food product and also allows food products to be heated quickly via pressure-cooking.

In addition, many systems and methods have been created to test the integrity of sealed packages such as the aforementioned packages. Such testing is important for preventing packaging failures such as seal failure, ingress of bacteria or other contaminants, and the like.

Many such systems and methods have been created in the form of gas chambers. Some such systems test the integrity of sealed packages having both gas permeable and non-gas-permeable portions. In one such system, the gas chamber contains a purge gas inlet, an outlet gas tube, and a tracer gas tube. The sealed package is placed within the gas chamber such that the gas-permeable portion is attached to a temporary barrier layer. The temporary barrier layer contains an aperture within its center that is aligned with the tracer gas tube. This aperture allows the tracer gas to permeate the sealed package via its gas-permeable portion. The non-gas-permeable portion of the package being test, as well as the point of attachment of the gas-permeable portion to the non-gas-permeable, are positioned within the chamber such that they do not physically contact the source of the tracer gas. Thereafter, a purge gas such as air or nitrogen is introduced into the chamber via the purge gas inlet. The purge gas is passed through the chamber and exits a vent in communication with the outlet gas tube such that no tracer or other gases remain within the chamber. Once the chamber is purged of all gases except the purge gas, the vent is closed and the purge gas source is shut off. An inert tracer gas such as carbon dioxide, helium, or neon is then introduced into the sealed package via the tracer gas tube and temporary barrier layer aperture. Gas within the chamber then exits the outlet gas tube and is transported to an analytical device such as a mass spectrometer. The concentration of the exiting gas is then analyzed to determine if any of the tracer gas was able to permeate the sealed package.

In a similar system, a gas chamber includes a conduit and an exhaust device in addition to a purge gas inlet, an outlet gas tube, and a tracer gas tube. This system functions in the same manner as the aforementioned system with the exception of the method for delivering the tracer gas. Although the tracer gas is introduced into the sealed package via the tracer gas tube and temporary barrier aperture, it is thereafter passed through the conduit to the exhaust device. This allows a continuous flow of tracer gas to enter the sealed package thereby providing more rapid delivery of the tracer gas. This increased delivery facilitates leakage, if leakage is to occur, thereby decreasing the time required to test the integrity of the sealed package.

Another known method of testing packaging is liquid dye testing. Some such methods are defined by the American Society for Testing and Materials International's ("ASTM") Test Method F-1929. During such testing, the packaging is filled with liquid dye for a predetermined time period. A determination regarding the integrity and/or seal integrity of such packaging is determined based upon the leakage of such liquid dye through the packaging. However, the current use of liquid dye to test for seal defects in packages is messy and, due to the porosity of permeable packages, can lead to erroneous results.

Yet another known method of testing packaging includes testing via internal pressurization. Some such methods are defined by the ASTM's Test Method F-2096. This method tests for gross leaks (i.e., leaks greater than 250 μm) by placing the package to be tested underwater and inflating the package to a predetermined pressure. After the pressure has stabilized, the package is observed to ascertain whether any steady streams of bubbles are flowing therefrom. Such bubble streams, if any, evidence a gross leak.

In yet another known method of testing packaging is pressure decay testing. Some such methods are defined by the ASTM's Test Method F-2095. During such testing, the packaging is pressurized. After a predetermined time period, the pressurization of the packaging is tested to determine integrity and/or seal strength of such packaging. This method is capable of detecting leaks at a rate of $1 \times 10^{-4}$ seconds and is designed to detect very small defects in packaging such as those responsible for bacterial contamination of the package. However, for permeable packages, the use of pressure decay testing is not possible due to the permeability of the package as the typical permeability of the package is an order of magnitude greater than the detectability required to perform such testing.

In many instances, the testing systems and methods discussed above have been limited to impermeable and/or non-porous materials and packaging since permeable and/or porous materials and packaging have been difficult to test due to the leakage caused by the normal permeability of such packaging. In most instances, permeable and porous materials and/or packaging are currently tested non-quantitatively for seal defects, integrity, and the like via subjective, visual inspections such as those prescribed in ASTM Test Standard F-1886.

BRIEF SUMMARY OF THE INVENTION

Briefly stated, in one aspect of the present invention, a method for testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, is provided. This method includes selecting at least one test package from said plurality of sealed packages for testing, applying at least one coating to said first surface of said at least one test package for converting said first surface to a second surface, said second surface selected from the group consisting of an impermeable surface, a non-porous surface, and combinations thereof, and performing at least one test upon said at least one test package to determine a presence of said defects in said test package and said plurality of sealed packages.

Also disclosed is a method of testing, a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof wherein the method includes selecting at least one test package from said plurality of sealed packages for testing, applying at least one coating to said first surface of said at least one test package for converting said first surface to a second surface, said second surface selected from the group consisting of an impermeable surface, a non-porous surface, and combinations thereof; for the sole purpose of testing of said at least one test package, pressurizing the at least one test package, measuring a loss of pressure in the at least one test package, and correlating the loss of pressure with a presence of said defects in said test package and said plurality of sealed packages.

Also disclosed is a method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, wherein the method includes selecting at least one test package from said plurality of sealed packages for testing, applying at least one coating to said first surface of said at least one test package for converting said first surface to a second surface, said second surface selected from the group consisting of an impermeable surface, a non-porous surface, and combinations thereof for the sole purpose of testing of said at least one test package, applying at least one dye to the at least one test package, measuring a penetration of the dye into or through at least one of the group consisting of the at least one test package, a seal of said at least one test package, and combinations thereof, and correlating the penetration of the dye with a presence of said defects in said test package and said plurality of sealed packages.

Further disclosed is a method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, wherein the method includes selecting at least one test package from said plurality of sealed packages for testing, applying at least one coating to said first surface of said at least one test package for converting said first surface to a second surface, said second surface selected from the group consisting of an impermeable surface, a non-porous surface, and combinations thereof; for the sole purpose of testing of said at least one test package, evacuating the at least one test package, measuring a gain in pressure in the at least one test package, and correlating the gain in pressure with a presence of said defects in said test package and said plurality of sealed packages.

Also disclosed is a method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, wherein the method includes selecting at least one test package from said plurality of sealed packages for testing, applying at least one coating to said first surface of said at least one test package for converting said first surface to a second surface, said second surface selected from the group consisting of an impermeable surface, a non-porous surface, and combinations thereof; for the sole purpose of testing of said at least one test package, placing the at least one test package in an enclosed environment, filling the at least one test package with at least one tracer gas, measuring the tracer gas escaping from the at least one test package into the enclosed environment, and correlating the escaped tracer gas with a presence of said defects in said test package and said plurality of sealed packages.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a package" includes a plurality of packages. Thus, for example, a reference to "a method" includes one or more methods, and/or steps of the type described herein and/or which will become apparent to those persons skilled in the art upon reading this disclosure.

As used in this specification and in the appended claims, "permeable" is intended to describe both "permeable and/or porous" items such as surfaces, packaging, and the like. Similarly, "impermeable" is intended to describe both "impermeable and/or non-porous" items such as surfaces, packaging, and the like.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Figure 1:
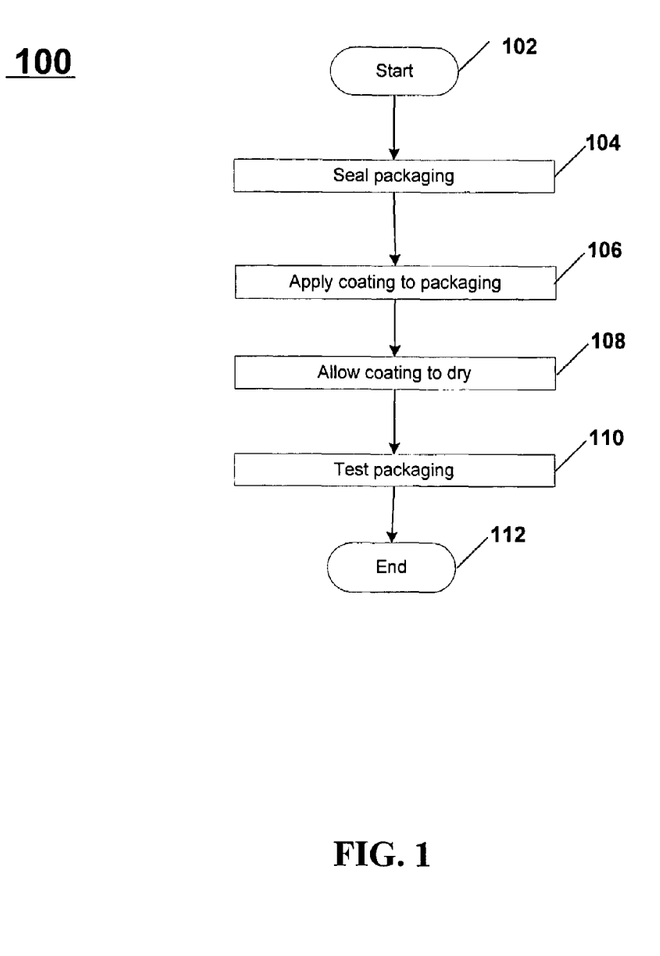
FIG. 1 depicts a flowchart of an exemplary method of testing packaging in accordance with one embodiment of the present invention.

Referring first to FIG. 1, illustrated is an exemplary embodiment of a method for testing packaging. Process 100 begins at 102. For example, at 102, a package or packaging has been created and/or selected. Such packaging may include, but is not limited to, medical device, pharmaceutical, and diagnostic packaging. The package may be formed in any one, or a combination of, forms including pouches, rigid and semi-rigid covered trays (e.g., trays having a lid), bags (e.g., header bags), blister packs, and the like.

In some aspects of the present invention, the package is manufactured from a permeable or otherwise porous material. Many such permeable and/or porous materials allow gases to pass through while preventing the passage of bacteria. One example of such a material is Tyvek® as manufactured by DuPont, Inc. Tyvek® is commonly used for medical device packaging, food packaging, shipping envelopes, construction materials, protective apparel, and the like to provide a strong, lightweight, vapor-permeable material that is water, chemical, puncture, tear, and abrasion resistant.

Figure 2A:
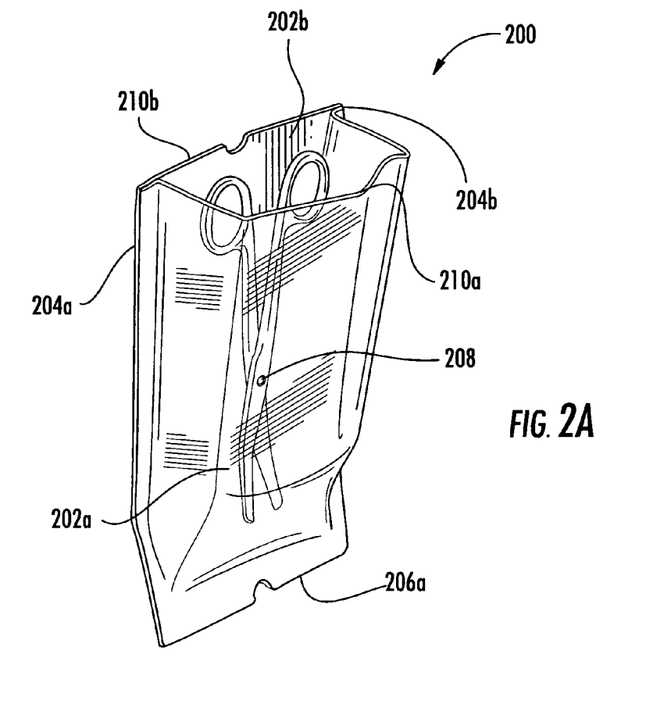
FIG. 2A depicts a perspective view of a package for use with the systems and methods of the present invention.
Figure 2B:
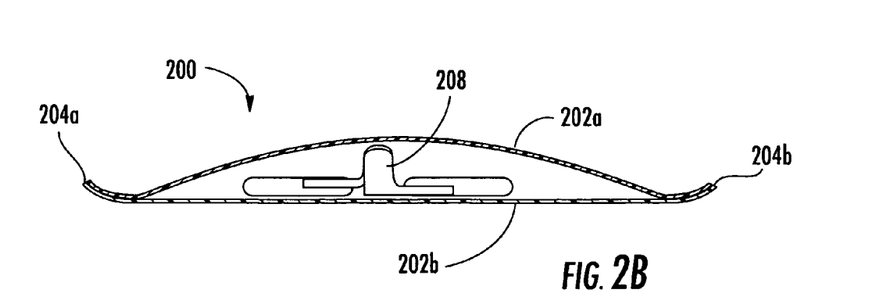
FIG. 2B depicts a cross-sectional view of the package depicted in FIG. 2A.

Turning to FIGS. 2A and 2B, depicted are a perspective view and a cross-sectional view, respectively, of an exemplary package 200 for use with the testing systems and methods of the present invention. Package 200 is depicted as a pouch consisting of two sides, namely first side 202*a* and second side 202*b*. First side 202*a* and second side 202*b* are sealed along their longitudinal edges to create longitudinal seams 204*a* and 204*b*. First side 202*a* and second side 202*b* have also been sealed along their downwardly facing latitudinal edges to create latitudinal seam 206*a*. Longitudinal seams 204*a* and 204*b* and latitudinal seam 206*a* seal package 200 on three of its four sides such that items such as item 208 inserted through the unsealed side (i.e., the upwardly facing latitudinal side) are retained within package 200 when it is in an upright position as depicted in FIG. 2A.

FIG. 2B depicts a cross sectional view of the exemplary package 200 of FIG. 2A. Items inserted and/or contained within package 200 such as item 208 are sandwiched between first and second sides 202*a* and 202*b*, respectively. Such items are partially maintained within package 200 via sealing of package 200 via longitudinal seals 204*a* and 204*b* as shown, as well as latitudinal seal 206*a* (FIG. 2A). Furthermore, after all items have been inserted in package 200, a seal may then be created along the upwardly facing edge of package 200 by completely adhering or otherwise affixing first side upwardly facing edge 210*a* (FIG. 2A) to second side upwardly facing edge 210*b* (FIG. 2A) such that items contained within package 200 are completely protected from the environment. That is, due to the complete seal formed along all edges of first side 204*a* to second side 204*b*, dust, debris, and the like contained in the environment surrounding package 200 will be prevented from entering package 200 and/or contaminating items contained therein.

Referring back to FIG. 1, after completion of 102, process 100 then optionally proceeds to 104. If 104 is not required, process 100 proceeds to 106. At 104, the package or packaging to be tested is sealed such that the contents contained within the package or packaging, if any, are completely isolated from the environment external to the package or packaging. For example, for a package such as package 200 (FIG. 2A), sealing may include sealing first side upwardly facing edge 210*a* to second side upwardly facing edge 210*b* as discussed above with respect to FIG. 2A. However, any method of sealing a package or packaging may be substituted without departing from the scope of the present invention. Furthermore, it should be noted that step 104 is optional and may depend upon the type of testing being performed. For example, a sealed package may be required in order to pressurize the package, however, testing such as dye testing may not require sealing of the package or packaging. Additionally, some tested packages may be of a form that is not conducive to sealing. Additionally, if the package does not contain contents at the beginning of 104, this step may optionally include the step of inserting contents into the package in addition to sealing the package. Process 100 then proceeds to 106.

At 106, one or more coatings are applied to one or more surfaces of the package, packaging, package web, or other material to be tested. Preferably, the coating(s) are applied uniformly to all external permeable surfaces of the package, such that the permeable surfaces of the package are converted to impermeable surfaces. For example, in one aspect of the present invention, the sealed package is coated with a film-forming coating that dries such that the pores of the external permeable surfaces are filled to convert such permeable surfaces to impermeable surfaces. In some aspects of the present invention, the coating(s) dry to produce a thin film atop the package surface. However, alternate embodiments of the present invention are envisioned in which permeable surfaces are converted to impermeable surfaces without filling such pores. For example, virtually any substance that forms a homogeneous impermeable film that permanently adheres to the permeable material may be used. Furthermore, embodiments of the present invention are envisioned in which the external permeable surfaces are partially coated, or non-uniformly coated without departing from the spirit of the present invention. For example, the systems and methods of the present invention may be used to test packages having a small permeable surface included within a larger impermeable surface. Additionally, embodiments of the present invention are envisioned in which interior surfaces, or portions thereof, are coated in lieu of or in addition to all or a portion of the package's external surfaces. The coating(s) may be removable or permanent. Furthermore, the methods of applying and/or drying the coating(s) may be performed such that the coating is removable or permanent.

The application of such coating(s) to a permeable and/or porous package or other material transforms the package to an impermeable package, thereby allowing the package to be tested quantitatively for aspects such as seal strength, as well as seal and/or package integrity. Such quantitative testing, as further described herein, increases the sensitivity and repeatability of such testing. The enhanced sensitivity of the test increases the likelihood that seal defects and other package defects will be detected.

Additionally, systems and methods of testing packaging and/or materials which incorporate application of such coatings are simpler in construction and are more universally usable and more versatile in operation than those known in the art since such systems and methods allow the same systems and methods to be used for both permeable and impermeable packages and materials. Such versatility decreases the cost of overhead associated with the testing of a variety of packages and/or materials.

For example, conversion of a package's permeable surfaces to impermeable surfaces allows testing such as burst testing to be performed more quickly and more accurately since the impermeable surface is less susceptible to leakage than the permeable surface. Consequently, a package with impermeable surfaces will pressurize more quickly than a similar package having permeable surfaces. Furthermore, conversion of the package's permeable surfaces to impermeable surfaces eliminates the error caused by release of pressure due to permeability rather than packaging defects such as seal defects or deficient integrity of the packaging, thereby increasing the accuracy of such testing.

Similarly, conversion of a package's permeable surfaces to impermeable surfaces allows testing such as seal dye testing to be performed more quickly and more accurately since the impermeable surface is less susceptible to dye leakage than the permeable surface. Consequently, a tester may categorize leakage of a package with impermeable surfaces as a defect in the packaging more quickly than equivalent leakage of a similar package having permeable surfaces, as the permeable surfaces naturally allow leakage even if no packaging defect is present. Furthermore, conversion of the package's permeable surfaces to impermeable surfaces eliminates the error caused by release of dye due to permeability (i.e., bleed-through) rather than packaging defects such as seal defects or deficient integrity of the packaging, thereby increasing the accuracy of such testing.

Furthermore, conversion of a package's permeable surfaces to impermeable surfaces allows testing such as vacuum testing and other forms of pressure testing to be performed for packages having permeable surfaces. Such testing has not been possible heretofore as the permeability of such packaging affects the measurement of pressure decay and/or vacuum decay, thereby rendering the results of any such testing unreliable. However, conversion of the package's permeable surfaces to impermeable surfaces allows pressure to be created within the packaging and allows measurement of such pressure and/or vacuum decay to accurately determine packaging defects such as seal defects or defects in the integrity of the packaging without the error that would be introduced by a decay in pressure and/or vacuum caused by normal and ordinary leakage through the package's permeable surfaces.

Application of one or more coatings to a package or packaging may be performed using any one, or a combination of, a variety of methods and apparatus. In one aspect of the present invention, simple applicators such as brushes are used to paint the coating(s) on the packages via the bristles, or other heads, of a brush. In other aspects of the present invention, rollers may be used to roll the coating(s) atop the designated surfaces. In yet another aspect of the present invention, the coating(s) may be applied via a screening process in which coating is applied through a screen via a gravity or pressure feed. Alternatively, in another aspect of the present invention, sponge or sponge-like applicators are incorporated to sponge or dab the coating(s) onto the designated surfaces in a controlled manner. In still another aspect of the present invention, sprayers are used to spray the coating(s) onto the designated surfaces. Preferably, quick and easy methods of applying coatings that minimize the time and/or complexity of the testing method are preferred, however, longer and/or more complex methods of applying coatings may be incorporated without departing from the scope of the present invention.

Figure 2C:
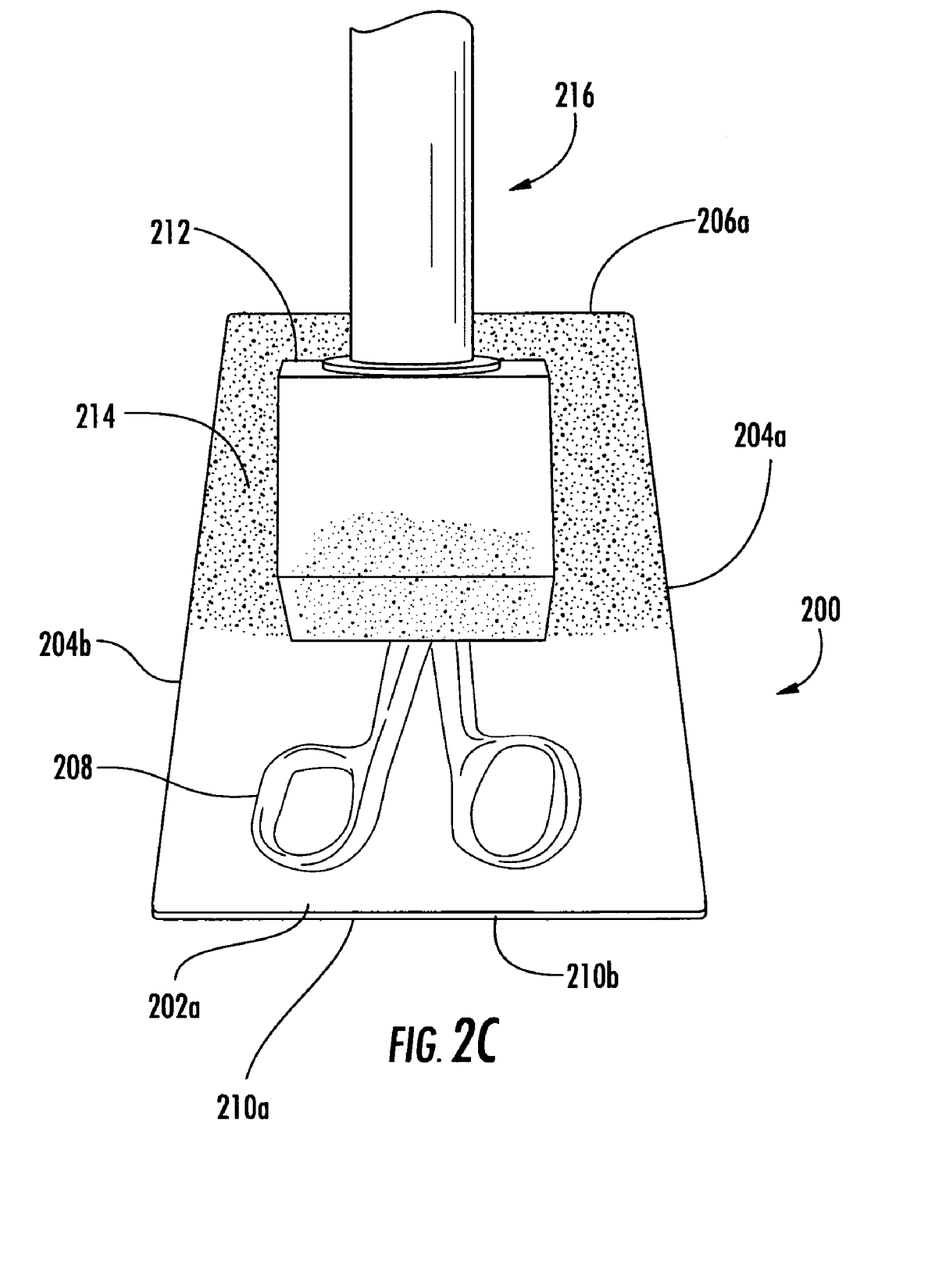
FIG. 2C depicts a method of coating the package depicted in FIG. 2A in accordance with one exemplary embodiment of the present invention.

Referring now to FIG. 2C, illustrated is an exemplary application of a coating 214 to package 200 of FIGS. 2A and 2B via a combined brush and sponge method. As depicted, first side 202a has been sealed to second side 202b (FIGS. 2A and 2B) at longitudinal seams 204a and 204b and at latitudinal seam 206a. Also, first side upwardly facing edge 210a has been sealed to second side upwardly facing edge 210b, thereby enclosing item 208 and completely isolating it from the environment external to package 200.

In the depicted exemplary embodiment, coating 214 is applied to the permeable external surfaces of package 200. As depicted in FIG. 2C, coating 214 is applied to the external surfaces of first side 202a and second side 202b (FIGS. 2A and 2B) via a brush 216 having a sponge applicator 212. Coating 214 may be applied by placing coating upon sponge applicator 212 (e.g., dipping sponge applicator 212 in a can, bowl, or the like of coating 214) and brushing coating 214 onto the external surfaces of the package to be coated. This process is repeated until package 200 is sufficiently coated. Although many methods of applying one or more coatings to a package or packaging have been enumerated herein, any method of or apparatus for applying coating(s) to a package may be substituted without departing from the scope of the present invention.

Although FIG. 2C depicts application of a coating to a package after it has been formed, after an item has been inserted therein, and after the package has been sealed, alternate timing for application of a coating may be substituted. For example, one or more coatings may be applied to the packaging material before the packaging is formed. With respect to package 200, one or more coatings may be applied to first side 202a and second side 202b prior to sealing the two sides together along their longitudinal or latitudinal edges. Or, alternatively, one or more coatings may be applied to the raw material from which a package is to be formed prior to preparing said raw material for same. With respect to our exemplary package 200, this may entail applying one or more coatings to the material from which first side 202a and second side 202b are cut prior to cutting of same. In yet another embodiment, one or more coatings may be applied to the surfaces of a package before an item is inserted therein. With respect to our exemplary package 200, this involves applying one or more coatings to package 200 before item 208 is inserted therein. Or, packages may be coated for testing wherein the testing is performed without insertion of an item in the packaging to be tested. In yet another embodiment, the coating(s) may be applied after insertion of an item but prior to sealing the package. With respect to our exemplary package 200, item 208 is inserted into package 200 and one or more coatings are then applied prior to sealing first side upwardly facing edge 210*a* to second side upwardly facing edge 210*b*. While many individual timings for application of one or more coatings to a package have been enumerated herein, it should be clear that coating(s) may be applied in accordance with the present invention at any time during the packaging process without departing from the scope of the present invention.

Referring back to FIG. 1, step 106, the applied coating(s) may be any coating(s) capable of accomplishing any one of the goals of the present invention as discussed herein (e.g., converting a permeable surface to an impermeable surface, coating the packaging with a thin film, filling the pores of a package surface, etc.). In one aspect of the present invention, such coating may be WholeSeal™ as distributed by Donbar Industries, Inc., which is an aqueous polyurethane emulsion. In other embodiments of the present invention, such coating(s) may include other types or brands of aqueous polyurethane emulsions, resin-based industrial coatings, acrylic-based paints, epoxies, and the like. After 106, process 100 optionally proceeds to 108. If 108 is not required, process 100 proceeds to 110.

At 108, some coatings may require a period of time and/or a specific process to dry prior to proceeding to 110. However, in some aspects of the present invention, 108 is optional as some coatings dry as they are applied. For example, in embodiments of the present invention in which WholeSeal™ is used as a coating, such coating may be air dried for a period of approximately one-half hour at room temperature. However, such drying time may be decreased by increasing the temperature of the ambient air during drying. However, coatings requiring other periods of time, other methods of drying, and/or having other criteria for determining such drying times and/or methods may be substituted without departing from the scope of the present invention. In some exemplary embodiments of the present invention, allowing the coating to dry causes the coating to form a homogenous, non-permeable barrier. Process 100 then proceeds to 110.

At 110, packages and/or packaging that have been prepared in accordance with the systems and/or methods of the present invention are subjected to testing such as package seal and package integrity testing. Several standard making bodies including the ASTM and the International Organization for Standardization ("ISO") define testing protocols and standards for various industries and applications. In some aspects of the present invention, the porous nature of permeable packages renders some such testing methods invalid and/or inoperable. However, coating permeable package surfaces and thereby transforming those surfaces into impermeable surfaces enables such otherwise ineffective testing methods to be performed in accordance with the prescribed testing standards and processes. Any one of these defined testing protocols and standards may be performed during 110 without departing from the scope of the present invention. Or, alternatively, testing methods deviating from such protocols and standards may also be performed in accordance with the present invention. A few specific examples of such testing methods are described in greater detail below with respect to FIGS. 3 through 6; however, the present invention is not so limited. Upon completion of 110, process 100 proceeds to 112 at which the method ends.

Figure 3:
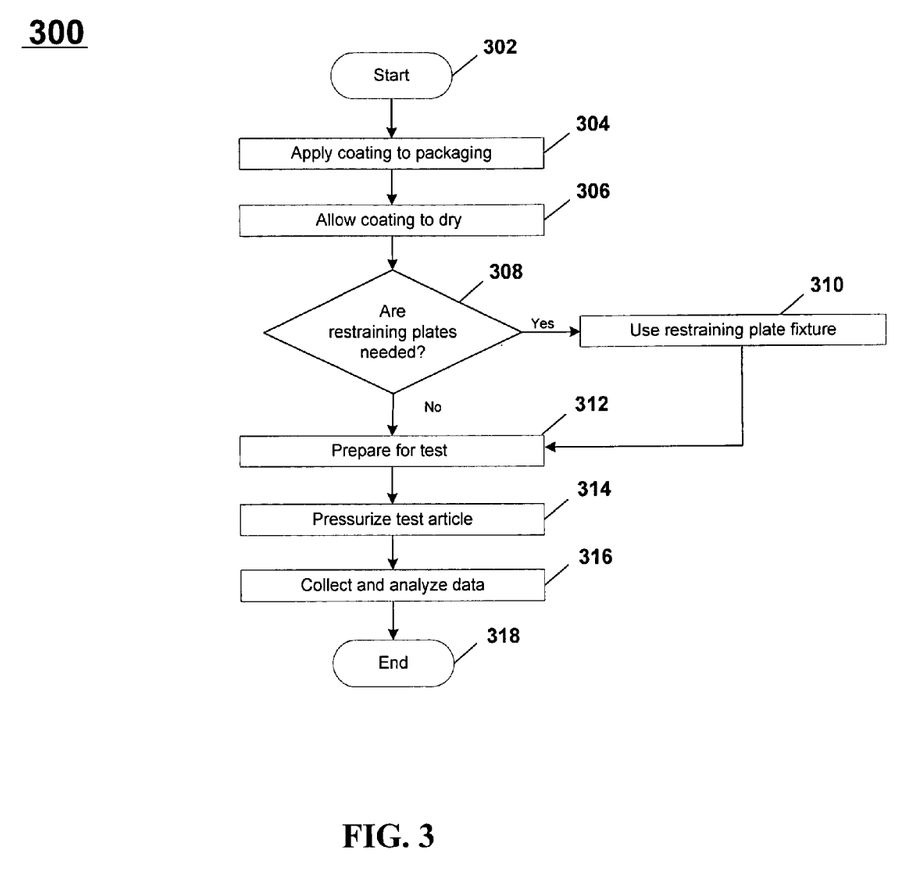
FIG. 3 depicts a flowchart of an exemplary embodiment of a method of testing packaging via pressure decay in accordance with the present invention.

Referring now to FIG. 3, depicted is a flowchart of an exemplary embodiment of a method of testing packaging via pressure decay in accordance with the present invention. ASTM Test Method F-2095 & F-2338 describes such a method for determining whether pinholes or other defects exist in the package using a pressure decay methodology. Heretofore, permeable packages could not be accurately tested by this method, as their inherent leak rate is far greater than the leak rate of small pinholes and/or channel(s) in the seal. However, coating the permeable package material with one or more coatings as described herein and in accordance with the systems and/or methods of the present invention seals the pores of the permeable material and forms a film thereupon which prevents pressure leakage through the previously permeable web, thereby allowing such packages or previously un-testable portions of such packages (e.g., film sides of pouch packages, tray sides of rigid packages, etc.) to be tested using these or other similar test methods.

Process 300 begins at 302 with selection of one or more sealed packages for testing. The package may be empty or may contain goods such as pharmaceutical products, medical devices, and the like. If goods are included, such goods have been packaged prior to process 300 via automated or manual means, potentially in a sterile environment. Furthermore, the package may have been sealed according to prescribed manufacturing processes including heat, adhesive, or other methods as known in the art. Exemplary types of packages suitable for testing via pressure decay include pouches, rigid and semi-rigid trays with flexible coverings, bags, roll stock, and the like. Once the package has been selected, process 300 proceeds to 304.

For permeable packages to be accurately evaluated using pressure decay testing, such packages must be transformed into impermeable packages to preclude leakage through the permeable material. At 304, a film-forming coating is applied to the external permeable surface(s) of the package in a similar manner to that described in greater detail above with respect to step 106 of FIG. 1. Once the package is coated, process 300 proceeds to 306, at which the coating dries, also as discussed above in greater detail with respect to step 108 of FIG. 1. Process 300 then proceeds to step 308.

At 308, a determination is made regarding whether restraining plate fixtures are required. Such determination is typically based upon factors such as package material, package form, package size, test sensitivity, and the like. For example, restraining plate fixtures may be utilized for package forms and/or materials that stretch or deform under pressure and are therefore difficult to stabilize. In such cases, restraining plate fixtures sized to match the dimensions of the coated package may be used to control the stretching and/or deforming of the package during testing, thereby increasing the sensitivity of the testing for such packages. If such restraining plate fixtures are desired or required, process 300 proceeds to 310, at which such restraining plate fixtures are used. Process 300 then proceeds to 312. Or, if restraining plate fixtures are not required, process 300 proceeds directly to 312.

At 312, preparation for testing is performed. In one exemplary embodiment, the pressure decay leak test instrument is a MDT-500 Leak Tester as manufactured by TM Electronics, Inc. The dry, coated package is placed into the test fixture as the test article. In one exemplary embodiment, the article under evaluation is a Tyvek® pouch coated with WholeSeal™ in accordance with the methods of the present invention. Test probes may be removably attached to the article under evaluation. In this exemplary embodiment, the test probes are TM Electronics Package-Port™ probes as manufactured by TM Electronics, Inc. Once the test equipment and package to be tested have been prepared, process 300 proceeds to 314.

At 314, the article under evaluation is pressurized to a fixed pressure. In one aspect of the present invention, the testing equipment "charges" applied pressure to the inside of the package through one or more test ports. Thereafter, the pressure is stabilized for a predetermined period of time. Once pressurization of the packaging has stabilized, process 300 proceeds to 316.

At 316, the packaging is observed for changes in pressure such as loss of pressure (i.e., pressure decay), and data is collected regarding same via the aforementioned test instruments (e.g., test probes). Specifically, after the pressurization of the package is stabilized, the pressure drop that occurs over a finite period of time is measured. For example, such pressure leakage may be caused by air leakage through holes or channels in the package seals and/or uncoated package sides. Such data is then analyzed to determine the rate of leakage of such packaging, if any, and to correlate the drop in pressure to the extent of leakage, if any, of the packaging. In some embodiments, a 50 micron orifice is used to calibrate the package under test and/or the testing equipment. In such embodiments, the package leak rate may be measured by comparing it to the leakage that occurs through the calibrated orifice (i.e., it may be determined that the package leakage rate is greater than or equivalent to a 50 micron orifice). Thereafter process 300 proceeds to 318, at which process 300 ends.

In some alternate embodiments of process 300, the package is pressurized with a tracer gas such as helium, carbon dioxide, and the like. In such embodiments, the test equipment measures the leakage of the tracer gas from the package. Thereafter, such leakage is correlated to the extent of leakage, if any, of the packaging.

Figure 4:
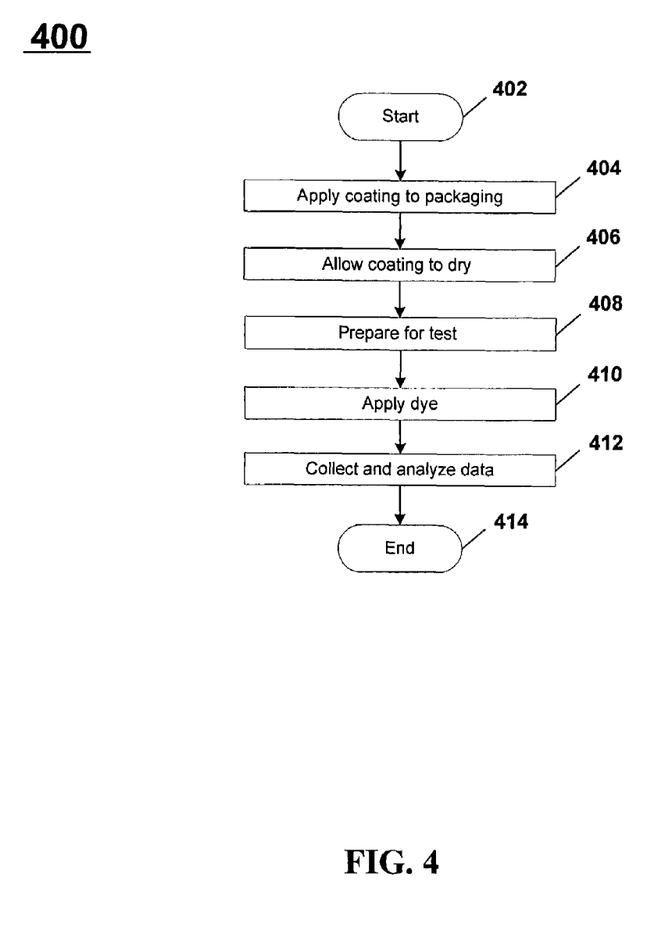
FIG. 4 depicts a flowchart of an exemplary embodiment of a method of testing packaging via dye seal penetration in accordance with the present invention.

Turning next to FIG. 4, depicted is a flowchart of an exemplary embodiment of a method of testing packaging via dye seal penetration in accordance with the present invention. ASTM Test Method F-1929 describes such a method for determining whether seal defects exist in permeable packages such as permeable medical device, pharmaceutical, or diagnostic containment packages.

Process 400 begins at 402 with selection of one or more sealed packages for testing. The package may be empty or may contain goods such as pharmaceutical products, medical devices, diagnostic devices, and the like. If goods are included, such goods have been packaged prior to process 400 via automated or manual means, potentially in a sterile environment. Furthermore, the package may have been sealed according to prescribed manufacturing processes including heat, adhesive, or other methods as known in the art. Exemplary types of packages suitable for testing via pressure decay include pouches, rigid and semi-rigid trays with flexible coverings, bags, roll stock, and the like. Once the package has been selected, process 400 proceeds to 404.

If the selected package is fabricated, at least in part, from paper or spun bonded polyolefin, the tests must be accomplished quickly (i.e., in less than thirty (30) seconds). Otherwise, the dye will penetrate the permeable material resulting in false positives. Consequently, for permeable packages to be accurately evaluated using dye seal penetration testing, such packages must be transformed into impermeable packages to preclude leakage through the permeable material. To accomplish this, a film-forming coating is applied to the external permeable surface(s) of the package at step 404 in a similar manner to that described in greater detail above with respect to step 106 of FIG. 1. Once the package is coated, process 400 proceeds to 406, at which the coating dries, also as discussed above in greater detail with respect to step 108 of FIG. 1. Such application of a coating prevents the dye from penetrating the packaging or other material under test, increasing the time allowed for testing and thereby increasing the likelihood that seal defects will be detected. Process 400 then proceeds to step 408.

At 408, preparation for testing is performed. In one exemplary embodiment, the dye seal penetration test equipment includes a container in which a dye solution is mixed and a test fixture (e.g., tray) for holding the package under test and collecting any dye solution which permeates the package contained therein. The dry, coated package is placed into the test fixture or container as the test article. In one exemplary embodiment, the article under evaluation is a Tyvek® pouch coated with WholeSeal™ in accordance with the methods of the present invention.

At 410, a dye penetrant solution is applied to the article (e.g., injected into the article, poured into the article, etc.) under evaluation. Once the dye solution has been applied to the package for the required amount of time, process 400 proceeds to 412. At 412, the packaging is observed visually for the presence of the dye solution in areas such as the package seal areas and data is collected regarding same. Since such tests are typically performed visually, the results are subjective rather than quantitative. That is, it is only determined whether dye has passed through the packaging (e.g., via a hole and/or channel). In some embodiments, an optical measuring device such as a microscope may be used to measure the size of the package opening. However, such embodiments, when performed in accordance with ASTM test methods, are not typically capable of detecting leakage through holes and/or channels having a diameter less than 0.003" inch. Thereafter process 400 proceeds to 414, at which process 400 ends.

Figure 5:
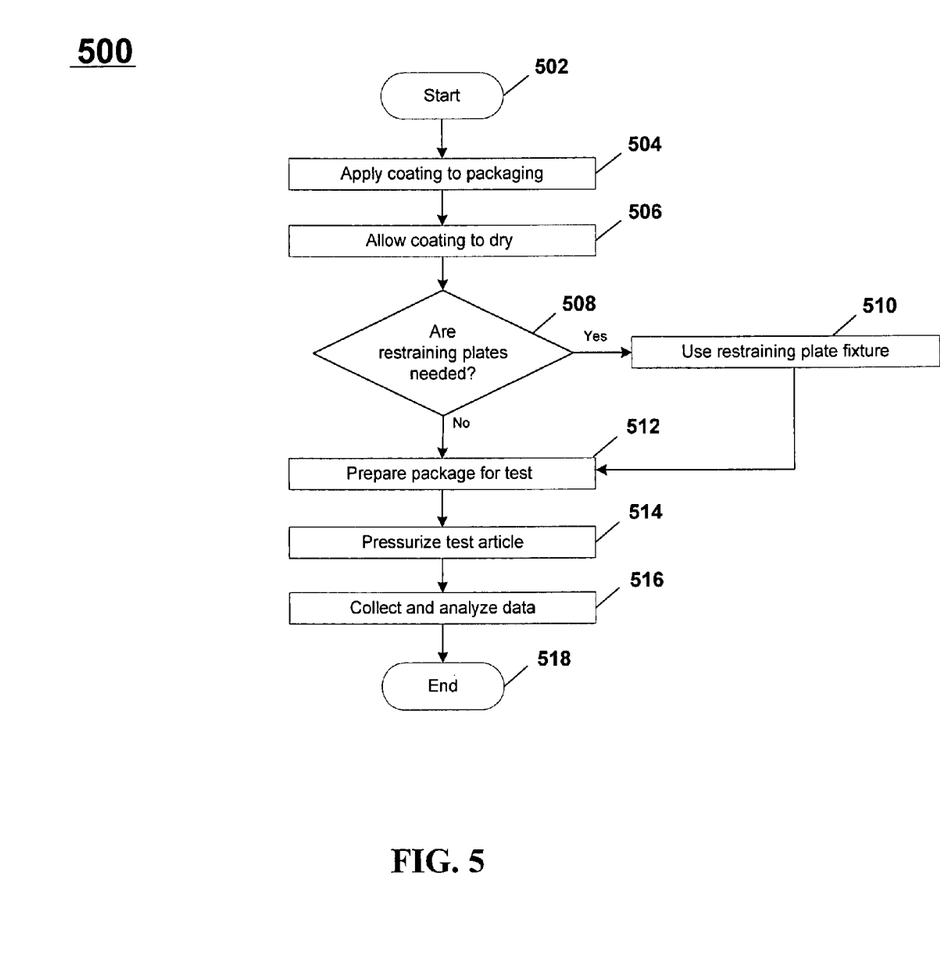
FIG. 5 depicts a flowchart of an exemplary embodiment of a method of testing packaging via seal strength testing in accordance with the present invention.

Referring now to FIG. 5, depicted is a flowchart of an exemplary embodiment of a method of testing seal strength via burst pressure in accordance with the present invention. ASTM Test Method F-1140 & F-2054 describes such a method for measuring seal strength of a package using burst pressure methodology. Heretofore, the ability to test large permeable packages (i.e., packages having greater than approximately one hundred forty four (144) square inches of permeable material) via a burst pressure methodology was limited, if not impossible, due to the inability of the test equipment to charge the package with sufficient air and pressure to create enough force to burst the seals. Such inability typically occurs because the permeable portions of the package allow air to permeate through the package walls while the package is being charged. However, coating the permeable package material with one or more coatings as described herein and in accordance with the methods of the present invention seals the pores of the permeable material and forms a film thereupon which prevents leakage through the previously permeable web, therefore allowing such packages or previously un-testable portions of such packages (e.g., film sides of pouch packages, tray sides of rigid and semi-rigid packages, etc.) to be tested using these or other similar test methods.

Process 500 begins at 502 with selection of one or more sealed packages for testing. The package may be empty or may contain goods such as pharmaceutical products, medical devices, and the like. If goods are included, such goods have been packaged prior to process 500 via automated or manual means, potentially in a sterile environment. Furthermore, the package may have been sealed according to prescribed manufacturing processes including heat, adhesive, or other methods as known in the art. Exemplary types of packages suitable for testing via pressure decay include pouches, rigid and semi-rigid trays with flexible coverings, bags, roll stock, and the like. Once the package has been selected, process 500 proceeds to 504.

For permeable packages to be accurately evaluated using burst pressure testing, such packages must be transformed into impermeable packages to preclude leakage through the permeable material. At 504, a film-forming coating is applied to the external permeable surface(s) of the package in a similar manner to that described in greater detail above with respect to step 106 of FIG. 1. Once the package is coated, process 500 proceeds to 506, at which the coating dries as discussed above in greater detail with respect to step 108 of FIG. 1. Process 500 then proceeds to step 508.

At 508, a determination is made regarding whether restraining plate fixtures are required. Such determination is typically based upon factors such as package material, package form, and the like. For example, restraining plate fixtures may be utilized for package forms and/or materials that stretch or deform under pressure and are therefore difficult to stabilize. In such cases, restraining plate fixtures sized to match the dimensions of the coated package may be used to control the stretching and/or deforming of the package during testing, thereby increasing the sensitivity of the testing for such packages. If such restraining plate fixtures are desired or required, process 500 proceeds to 510 at which such restraining plate fixtures are used. Process 500 then proceeds to 512. Or, if restraining plate fixtures are not required, process 500 proceeds directly to 512.

At 512, preparation for testing is performed. In one exemplary embodiment, the burst pressure test instrument is an automated package tester such as model no. BT-1000 as manufactured by TM Electronics, Inc. In one exemplary embodiment, the dry, coated package is coated with WholeSeal™ in accordance with a method of the present invention. One or more test probes may then be removably attached to the article under evaluation. In this exemplary embodiment, the test probes are integral to the BT-1000 and utilize TM Electronic's PackagePort™ technology.

At 514, the article under evaluation is internally pressurized in an increasing manner. Once an area of the perimeter of the package seal bursts in response to the pressurization of the test, process 500 proceeds to 516. At 516, data is collected regarding the time and/or pressure required for bursting of the package, the extent of the burst, etc. Such data is then analyzed to determine the strength of the package seals and/or integrity of the packaging. Thereafter process 500 proceeds to 518, at which process 500 ends.

Figure 6:
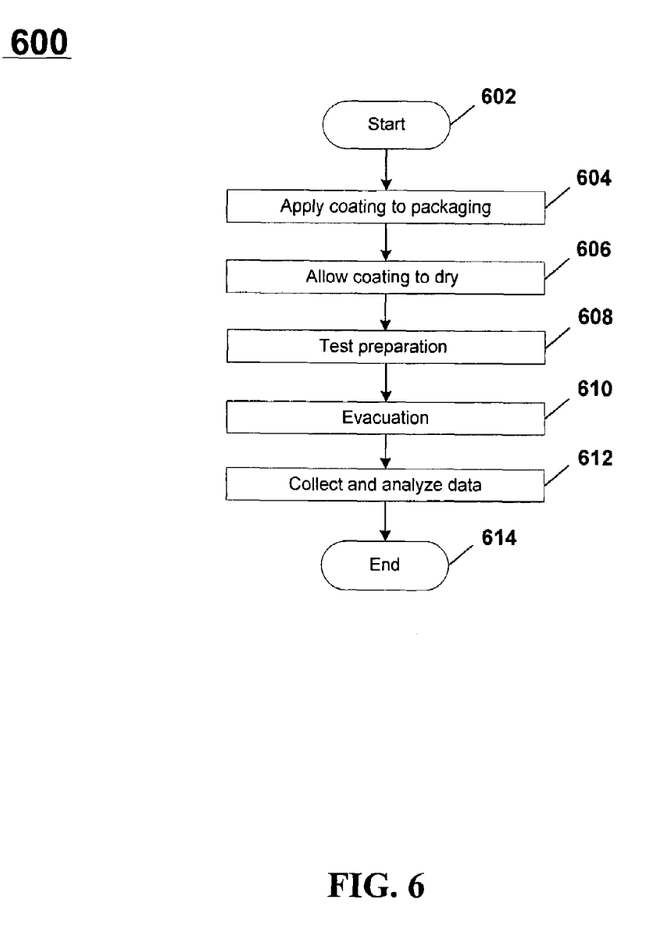
FIG. 6 depicts a flowchart of an exemplary embodiment of a method of testing packaging via vacuum decay in accordance with the present invention.

Turning now to FIG. 6, depicted is a flowchart of an exemplary embodiment of a method of testing packaging via vacuum decay in accordance with the present invention. ASTM Test Method F-2338 describes such a method for determining whether pinholes or other defects exist in the package using a vacuum decay methodology involving an absolute or differential pressure transducer leak detector.

Process 600 begins at 602 with selection of one or more sealed packages for testing. The package may be empty or may contain goods such as pharmaceutical products, medical devices, and the like. If goods are included, such goods have been packaged prior to process 600 via automated or manual means, potentially in a sterile environment. Furthermore, the package may have been sealed according to prescribed manufacturing processes including heat, adhesive, or other methods as known in the art. Exemplary types of packages suitable for testing via vacuum decay include pouches, rigid and semi-rigid trays with flexible coverings, bags, roll stock, and the like. Once the package has been selected, process 600 proceeds to 604.

For permeable packages to be accurately evaluated using vacuum decay testing, such packages must be transformed into impermeable packages to preclude leakage through the permeable material. At 604, a film-forming coating is applied to the external permeable surface(s) of the package in a similar manner to that described in greater detail above with respect to step 106 of FIG. 1. Once the package is coated, process 600 proceeds to 606, at which the coating dries as discussed above in greater detail with respect to step 108 of FIG. 1. Process 600 then proceeds to step 608.

At 608, preparation for testing is performed. In one exemplary embodiment, the vacuum decay leak test instrument is a Non-Destructive Inspection System having model no. PTI-325 and as manufactured by Packaging Technologies and Inspection Company. The dry, coated package is placed into the test fixture (e.g., a vacuum chamber) as the test article. In one exemplary embodiment, the article under evaluation is a Tyvek® pouch coated with WholeSeal™ in accordance with the methods of the present invention.

At 610, the air is removed from the vacuum chamber into which the article has been placed. Once vacuum conditions are achieved within the vacuum chamber, process 600 proceeds to 612. At 612, the chamber is monitored for an increase in pressure, and data is collected regarding same. Such data is then analyzed to determine the rate of leakage of such packaging, if any, and to correlate such leakage to the level of seal strength and/or integrity of the packaging. Thereafter process 600 proceeds to 614, at which process 600 ends.

Although the present invention has been discussed herein with respect to testing packages, such methods may be used to test articles other than packages (e.g., raw materials, non-package products, etc.) without departing from the scope of the present invention.

It should be clear that the present invention is not limited to the method or detail of construction, fabrication, material, or application of use described and illustrated herein. Any other variation of fabrication, use, or application should be considered apparent as an alternative embodiment of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

I claim:

1. A method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, comprising the steps of:

selecting at least one test package from said plurality of sealed packages for testing;

applying at least one coating to said first surface of said at least one test package for converting said first surface to a second surface, said second surface selected from the group consisting of an impermeable surface, a non-porous surface, and combinations thereof; and performing at least one test upon said at least one test package to determine a presence of said defects in said test package and said plurality of sealed packages.

2. A method according to claim 1, wherein said sealed package is at least one of the group consisting of medical device packaging, pharmaceutical packaging, diagnostic packaging, a flexible pouch, a rigid tray, a semi-rigid tray, a bag, a blister pack, and combinations thereof.

3. A method according to claim 1, wherein said applying of said coating to said at least one first surface performs at least one of the group consisting of filling the pores of said first surface, forming an impermeable film upon said first surface, and combinations thereof.

4. A method according to claim 1, wherein said coating is one of the group consisting of removable and permanent.

5. A method according to claim 1, wherein said test is at least one of the group consisting of repeatable, quantitative, sensitive, accurate, and combinations thereof.

6. A method according to claim 1, wherein said test is at least one of the group consisting of a burst test, a dye seal penetration test, a vacuum decay test, a pressure decay test, a tracer gas test, and combinations thereof.

7. A method according to claim 1, wherein said applying includes at least one of the group consisting of brushing said coating onto said first surface, rolling said coating onto said first surface, applying said coating via a screening process, sponging said coating onto said first surface, spraying said coating onto said first surface, and combinations thereof.

8. A method according to claim 1, wherein said coating is at least one of the group consisting of WholeSeal$^{TM}$, a resin-based industrial coating, an acrylic-based paint, an epoxy, and combinations thereof.

9. A method according to claim 1, further comprising:
drying said at least one coating prior to said performing said at least one test.

10. A method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, comprising the steps of:

selecting at least one test package from said plurality of sealed packages for testing;

applying at least one coating to said first surface of said at least one test package for converting said first surface to a second surface, said second surface selected from the group consisting of an impermeable surface, a non-porous surface, and combinations thereof; for the sole purpose of testing of said at least one test package;

pressurizing said at least one test package;

measuring a loss of pressure in said at least one test package; and correlating said loss of pressure with a presence of said defects in said test package and said plurality of sealed packages.

11. A method according to claim 10, said method further comprising:

using at least one restraining plate fixture to control at least one of the group consisting of stretching of said at least one test package, deforming of said at least one test package, and combinations thereof.

12. A method according to claim 10, further comprising:
drying said at least one coating prior to said pressurizing of said at least one test package.

13. A method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, comprising the steps of:

selecting at least one test package from said plurality of sealed packages for testing;

applying at least one coating to said first surface of said at least one test package for converting said first surface to a second surface, said second surface selected from the group consisting of an impermeable surface, a non-porous surface, and combinations thereof; for the sole purpose of testing of said at least one test package;

applying at least one dye to said at least one test package;

measuring a penetration of said dye into or through at least one of the group consisting of said at least one test package, a seal of said at least one test package, and combinations thereof; and correlating said penetration of said dye with a presence of said defects in said test package and said plurality of sealed packages.

14. A method according to claim 13, further comprising:
drying said at least one coating prior to said applying said at least one dye to said at least one test package.

15. A method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, comprising the steps of:

selecting at least one test package from said plurality of sealed packages for testing;

applying at least one coating to said first surface of said at least one test package for converting said first surface to a second surface, said second surface selected from the group consisting of an impermeable surface, a non-porous surface, and combinations thereof; for the sole purpose of testing of said at least one test package;

evacuating said at least one test package;

measuring a gain in pressure in said at least one test package; and correlating said gain in pressure with a presence of said defects in said test package and said plurality of sealed packages.

16. A method according to claim 15, said method further comprising:

using at least one restraining plate fixture to control at least one of the group consisting of stretching of said at least one test package, deforming of said at least one test package, and combinations thereof.

17. A method according to claim 15, further comprising:
drying said at least one coating prior to said evacuating said at least one test package.

18. A method of testing a plurality of sealed packages for defects, said defects including at least one of the group consisting of seal defects, package defects, and combinations thereof, each of said sealed packages having a first surface selected from at least one of the group consisting of a permeable surface, a porous surface, and combinations thereof, comprising the steps of:

selecting at least one test package from said plurality of sealed packages for testing;

applying at least one coating to said first surface of said at least one test package for converting said first surface to a second surface, said second surface selected from the group consisting of an impermeable surface, a non-porous surface, and combinations thereof; for the sole purpose of testing of said at least one test package;

placing said at least one test package in an enclosed environment;

filling said at least one test package with at least one tracer gas;

measuring said tracer gas escaping from said at least one test package into said enclosed environment; and correlating said escaped tracer gas with a presence of said defects in said test package and said plurality of sealed packages.

19. A method according to claim 18, said method further comprising:
    using at least one restraining plate fixture to control at least one of the group consisting of stretching of said at least one test package, deforming of said at least one test package, and combinations thereof.

20. A method according to claim 18, further comprising:
    drying said at least one coating prior to said filling of said at least one test package.

21. A method according to claim 18, wherein said enclosed environment is a chamber.

* * * * *